United States Patent
Ebert et al.

(10) Patent No.: US 7,575,506 B2
(45) Date of Patent: Aug. 18, 2009

(54) AUTOMATIC SPREADING ADJUSTMENT

(75) Inventors: Detlef Ebert, Bad Nauheim (DE); Michael Hummel, Raunheim (DE)

(73) Assignee: Poly-Clip Systems GmbH & Co. KG (DE)

( * ) Notice: Subject to any disclaimer, the term of this patent is extended or adjusted under 35 U.S.C. 154(b) by 0 days.

(21) Appl. No.: 12/044,545

(22) Filed: Mar. 7, 2008

(65) Prior Publication Data

US 2008/0220704 A1   Sep. 11, 2008

(30) Foreign Application Priority Data

Mar. 8, 2007   (DE) ...................... 10 2007 011 422

(51) Int. Cl.
   *A22C 11/00*   (2006.01)
(52) U.S. Cl. ....................................... 452/35
(58) Field of Classification Search ............. 452/21–26, 452/29, 30–35, 37–39, 46–48, 51
See application file for complete search history.

(56) References Cited

U.S. PATENT DOCUMENTS

| | | | | |
|---|---|---|---|---|
| 3,748,690 A | * | 7/1973 | Niedecker | 452/31 |
| 4,044,425 A | * | 8/1977 | Nausedas | 452/45 |
| RE30,390 E | * | 9/1980 | Kupcikevicius et al. | 452/31 |
| 4,437,209 A | * | 3/1984 | Duroyon | 452/32 |
| 4,438,545 A | * | 3/1984 | Kupcikevicius et al. | 452/32 |
| 4,847,951 A | * | 7/1989 | Kollross | 452/48 |
| 4,980,949 A | * | 1/1991 | Stanley | 452/37 |
| 5,087,463 A | * | 2/1992 | Raudys et al. | 426/138 |
| 5,167,567 A | * | 12/1992 | Evans | 452/37 |
| 5,330,382 A | * | 7/1994 | Powers | 452/37 |
| 5,468,179 A | * | 11/1995 | Stanley et al. | 452/37 |
| 5,573,454 A | * | 11/1996 | Fox et al. | 452/29 |
| 6,524,178 B1 | * | 2/2003 | Fassler et al. | 452/37 |
| 2008/0085668 A1 | | 4/2008 | Ebert et al. | |

FOREIGN PATENT DOCUMENTS

| | | |
|---|---|---|
| DE | 1 786 585 | 5/1974 |
| DE | 196 44 074 A1 | 5/1998 |
| DE | 203 17 730 U1 | 1/2004 |
| DE | 102004015892 B4 | 2/2006 |
| WO | 02/087974 A1 | 11/2002 |

* cited by examiner

*Primary Examiner*—Thomas Price
(74) *Attorney, Agent, or Firm*—Hahn Loeser & Parks LLP; Michael H. Minns

(57) ABSTRACT

An apparatus for producing a plaited portion on a packaging casing material which accommodates a filling material, in particular sausage meat, wherein the plaited portion is at least approximately filling material-free at least during the formation thereof, including: a first displacer unit and a second displacer unit which is displaceable reversibly in a linear movement with respect to the first displacer unit, and a drive unit for at least the drive for the linear movement of the second displacer unit, wherein provided between the drive unit and the second displacer unit is at least one drive force transmission unit which transmits the drive force produced by the drive unit to the second displacer unit and which is pivotable reversibly about a pivot point, the position of which is adjustable.

10 Claims, 4 Drawing Sheets

US 7,575,506 B2

AUTOMATIC SPREADING ADJUSTMENT

Figure 1:
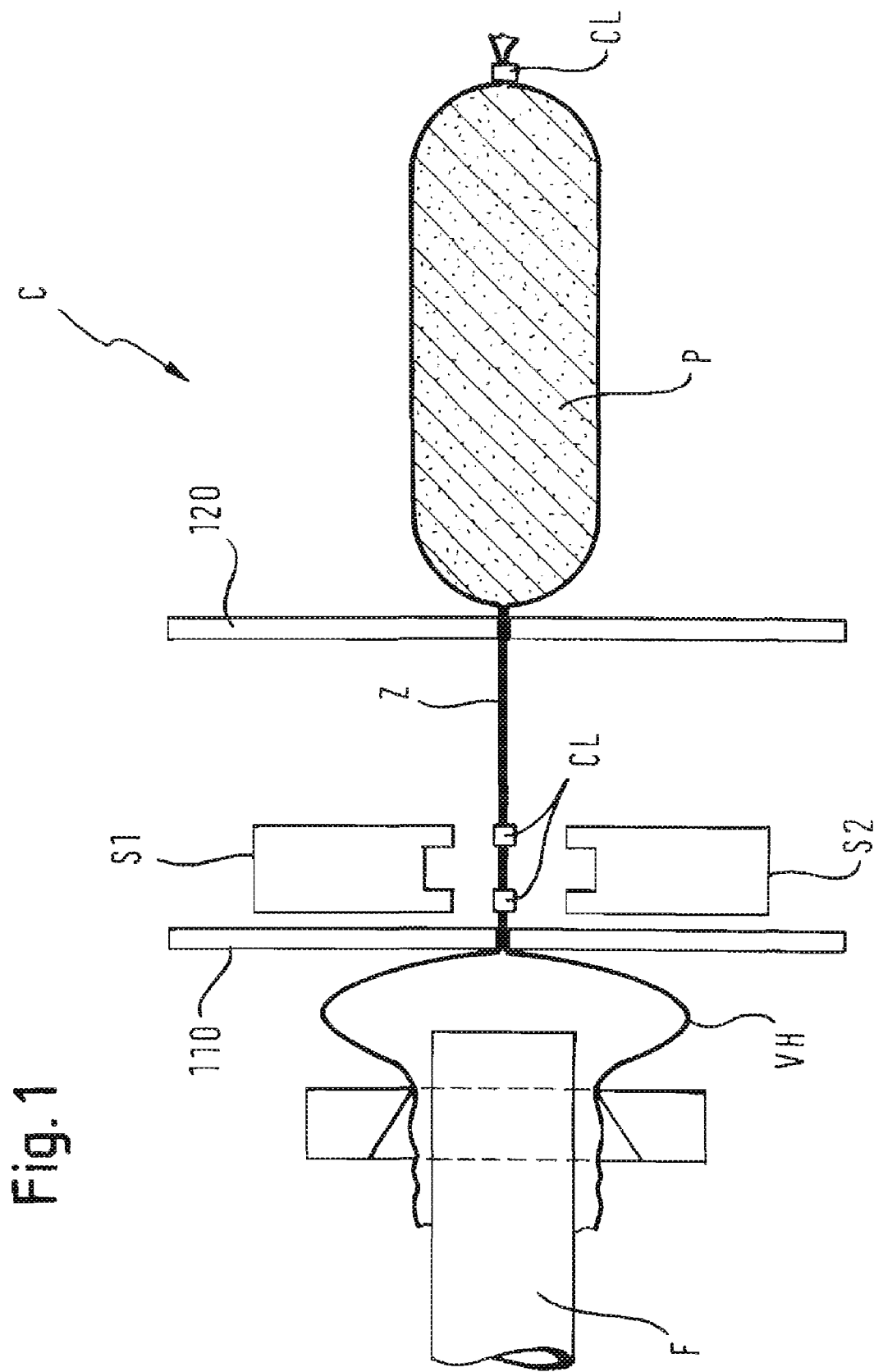

This patent application claims priority to German patent application DE 10 2007 011 422.4, filed Mar. 8, 2007, which is hereby incorporated by reference.

TECHNICAL FIELD

The invention concerns an apparatus for producing a filling material-free plaited portion on a packaging casing material.

BACKGROUND OF THE INVENTION

In the production of products in sausage form in tubular packagings, it is frequently desirable to obtain a product which is only partially or loosely filled therein. When dealing for example with jointing materials, such a package which is loosely filled can be opened for use without the contents unintentionally issuing therefrom upon being opened due to an elevated internal pressure. In the production of sausage products, a package which is only partially filled with sausage meat may be desirable in order to impart a cross-section different from a round cross-section to the sausage product and to stabilise it for example by cooking. For that purpose, during the cooking operation the sausage product is pressed into a suitable shape. A quadrangular or square cross-section may be desirable in the case of sausage products for example if they are intended as topping for toast. As a square cross-section is of a greater periphery than a round one, the packaging may not be filled chock-full. The filling material may also expand upon being cooked, without the risk of the packaging bursting.

Various methods are known from a practical context for the production of products in sausage form which are only loosely or partially filled, which methods provide the packaging casing or cover material that is additionally needed by pulling further packaging casing material off the supply thereof.

European patent application No 0 065 807 (U.S. Pat. No. 4,434,528) discloses a method in that a portion of a tubular packaging casing material which is closed at its front end by a clip is first filled so as to be chock-full. Displacer shears are stationarily arranged directly in front of the filling tube outlet. After the conclusion of the filling operation the displacer shears are moved between the chock-full portion of the packaging casing material and the filling tube. Arranged parallel to the conveyor path and downstream of the displacer shears in the conveyor direction is a pair of pressing jaws which then clamp the chock-full portion and move it away from the filling tube. In that operation, packaging casing material is further drawn off the supply thereof, through the stationary displacer shears. A constant internal pressure is maintained in the packaging by virtue of the pulling movement of the pressing jaws. When the packaging has reached a given length, with a predetermined amount of filling material, it is closed by fitting a second clip and separated from the rest of the supply of packaging casing material.

German patent No 3 840 522 discloses a method of forming a plaited portion on a sausage casing that accommodates sausage meat. That method is used in a sausage clipping machine that is very substantially of a conventional structure. In that case, after the sausage casing is filled with the sausage meat, two pairs of displacer shears are closed so that a portion of the sausage casing that accommodates the sausage meat and an empty portion of the sausage casing are formed. Spreading of the pairs of displacer shears then takes place, to form a plaited portion. In that operation the pair of displacer shears that are closest to the free end of the closed sausage casing are displaced along the path of advance movement of the sausage casing material in such a way that the portion of the sausage casing, which is filled with the sausage meat, is displaced in the direction of advance movement of the sausage casing material and at the same time empty sausage casing material is drawn on through the second pair of displacer shears. The empty sausage casing material that is drawn along in that operation forms a first filling material-free plaited portion which, when dealing with chock-full products, is required for fitting a closure clip and a further clip as the beginning of the next product. If there is a wish to have a sausage product that is only partially filled, the above-mentioned pair of displacer shears is displaced further along its path of advance movement. That further spreading movement, which is also referred to as overspreading, creates a filling material-free plaited portion of increased length. As soon as the desired length of plaited portion is reached, a second clip is fitted at the side of the second pair of displacer shears, being the side facing away from the first pair of displacer shears, and then the sausage casing material is cut off. That method, which in itself already operates well, uses a first drive for the first spreading movement as is necessary for closing chock-full packagings. A second drive provides for the overspreading effect, that is to say creating an elongated filling material-free plaited portion.

The aforementioned methods suffer from disadvantages. In the case of European application No 0 065 807, when dealing with a packaging of coarse-grain filling material, there is the risk that the packaging casing material is damaged upon being compressed. Apparatuses that operate in accordance with the method described in German patent No 3 840 522 use a first drive for spreading the pairs of displacer shears. As the overspreading movement represents an additional function, which is usually implemented by a subsequently fitted second drive.

SUMMARY OF THE INVENTION

An object of the present invention is to overcome the above-mentioned disadvantages. In particular an object of the invention is to provide an apparatus for producing a filling material-free plaited portion on a packaging casing material, which is of a simple structure and which permits simple setting of the stroke movement of the movable pair of displacer shears.

In particular, there is proposed an apparatus for producing a plaited portion on a packaging casing material that accommodates a filling material, in particular sausage meat, wherein the plaited portion is at least approximately filling material-free at least during the formation thereof. The apparatus includes a first displacer unit and a second displacer unit that is displaceable reversibly in a linear movement with respect to the first displacer unit. It further includes a drive unit for at least the drive for the linear movement of the second displacer unit. In that arrangement provided between the drive unit and the second displacer unit is at least one drive force transmission unit that transmits the drive force produced by the drive unit to the second displacer unit. The drive force transmission unit is pivotable reversibly about a pivot point and its position is adjustable.

Starting from the method in accordance with German patent No 3 840 522, there is therefore proposed an apparatus that is capable, using simple means, of producing a linear movement of the displacer unit both for the normal spreading movement and also for the overspreading effect. The proposed apparatus uses only one single drive for spreading the displacer shears and for overspreading. Furthermore it includes an actuating unit for stepless adjustment of the overspreading.

In one preferred embodiment for adjustment of the position of the pivot point there is provided an actuating unit that is pivotably connected to the drive force transmission unit and, which includes the pivot point and, which is displaceable reversibly along a guide path by means of an adjusting drive. Such an actuating unit permits simplified adjustment of the pivot point, which can possibly be automated by virtue of the use of a suitable adjusting drive and integrated into a process control system.

It is advantageous if the guide path is arranged in an orientation in which it extends parallel to a notional line between the pivotal connecting point of the second displacer unit and the force application point at the drive force transmission unit to the drive unit. In that way it is possible to implement a stroke adjustment of the movable pair of displacer shears, in which respect only the stroke end point is displaced but the starting point at which the pairs of displacer shears bear against each other always remains the same.

In accordance with the intended use of the proposed apparatus, adjustment of the position of the pivot point can be effected by motor but also manually, thereby permitting a simpler structure and simplified control.

If the adjusting drive is formed by a motor-driven gear that meshes with a gear rack provided at the actuating element, slip-free adjustment of the pivot point is possible.

It is further advantageous if the drive force transmission unit is formed by an actuating bar, which at its end facing towards the second displacer unit, is hingedly connected thereto and which at its end facing towards the drive unit is operatively connected to the drive unit. Such an actuating bar guarantees direct and loss-free transmission of the force.

In order to avoid collisions with other parts of the machinery in the region of its end facing towards the second displacer unit, the actuating bar can have an offset crank configuration which is in the plane of movement. A reduction in the structural length of the apparatus and also optimum adaptation of the position of the second displacer unit are further achieved by that crank configuration being of a suitable design.

In another preferred embodiment, the second displacer unit is guided along a first guide element arrangement, preferably formed by guide bars, the guide axis of which intersects the longitudinal central axis of the drive force transmission unit, cylindrical guide bars advantageously affording high guidance accuracy. The point of intersection of the axes ideally forms the connecting point between the drive force transmission unit and the second displacer unit for the direct application of force.

In the same manner in the region of the drive unit, the drive force transmission unit is guided along a third guide element arrangement, which is also preferably formed by guide bars and which may include a third guide means the guide axis of which intersects the longitudinal central axis of the drive force transmission unit.

It is also advantageous if the first and the third guide means are arranged at least approximately parallel to one another.

The actuating bar forms between the pivot point and the first guide element arrangement as a first lever portion and between the pivot point and the second guide element arrangement as a second lever portion. It is basically possible for the guide element arrangements to be disposed relative to each other as desired. If however they extend approximately parallel to each other, the ratio of the lever portions is approximately constant, irrespective of the angular position of the actuating bar. That provides that the second pair of displacer shears is moved, when a constant drive force is involved, with a constant force proportional to the lever ratio. In addition the distances covered by the ends of the levers are proportional to each other, thereby permitting simple and precise control.

If the drive force transmission unit is tied to the second guide element arrangement by means of an elastically hinged buffer element, load peaks from the drive can be damped. That provides that the packaging material is also treated carefully and possible damage is avoided. Damping the load peaks from the drive also provides for careful treatment of all of the subsequent mechanism and thus provides for less wear and a longer service life.

The drive unit for the drive force transmission unit can be designed in many different ways. In one preferred configuration, it is a cyclically operating drive unit which is advantageously formed by a cam disk. In that respect a slip-free and direct drive is ensured if the drive force transmission unit in the region of its end facing towards the drive unit has a guide roller which is in engagement with the guide path of the cam disk. To further reduce losses, the cycle of the drive unit can be matched to the operating cycle of the clipping machine.

In order to permit pivotal movement of the drive force transmission unit with respect to the drive unit, the drive force transmission unit should have a hinged mounting in the region of its end facing towards the drive unit, which hinged mounting in an advantageous embodiment is fitted to the second guide element arrangement.

In an advantageous embodiment it is provided that the first and/or the second displacer units are respectively formed by a linear spreading displacer. It is however also possible to use other displacers such as iris displacers.

For closing the packaging casing material there can be provided for example a closing fitting unit which is capable of fitting closure means, in particular clips, for closing the packaging casing material for forming products in sausage form.

There can further be provided a severing unit which is capable of severing portions of the packaging casing material from the supply of packaging casing material for forming products in sausage form.

There can further be provided a filling unit, preferably a filling tube, which is capable of introducing filling material into the packaging casing material and at which, in a further advantageous configuration, a supply of empty packaging casing material is provided.

Further advantageous configurations and an example of the invention are described in greater detail hereinafter in connection with the description of an embodiment in conjunction with the accompanying drawings. The terms 'top', 'bottom', 'left' and 'right' used in the description of the specific embodiment relate to the drawings in an orientation with normally readable references and Figure identifications.

BRIEF DESCRIPTION OF THE DRAWING FIGURES

Figure 2:
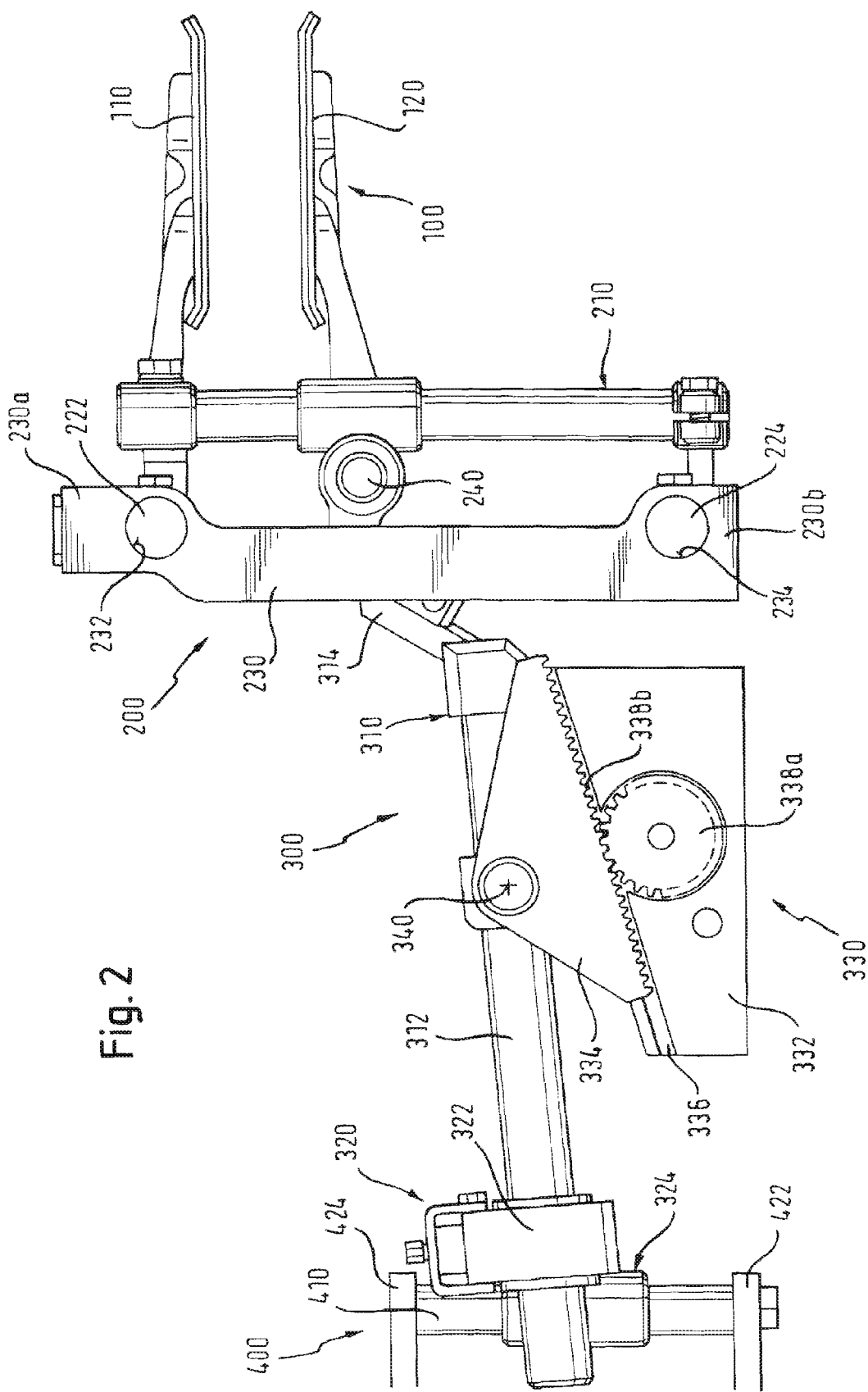
Figure 3:
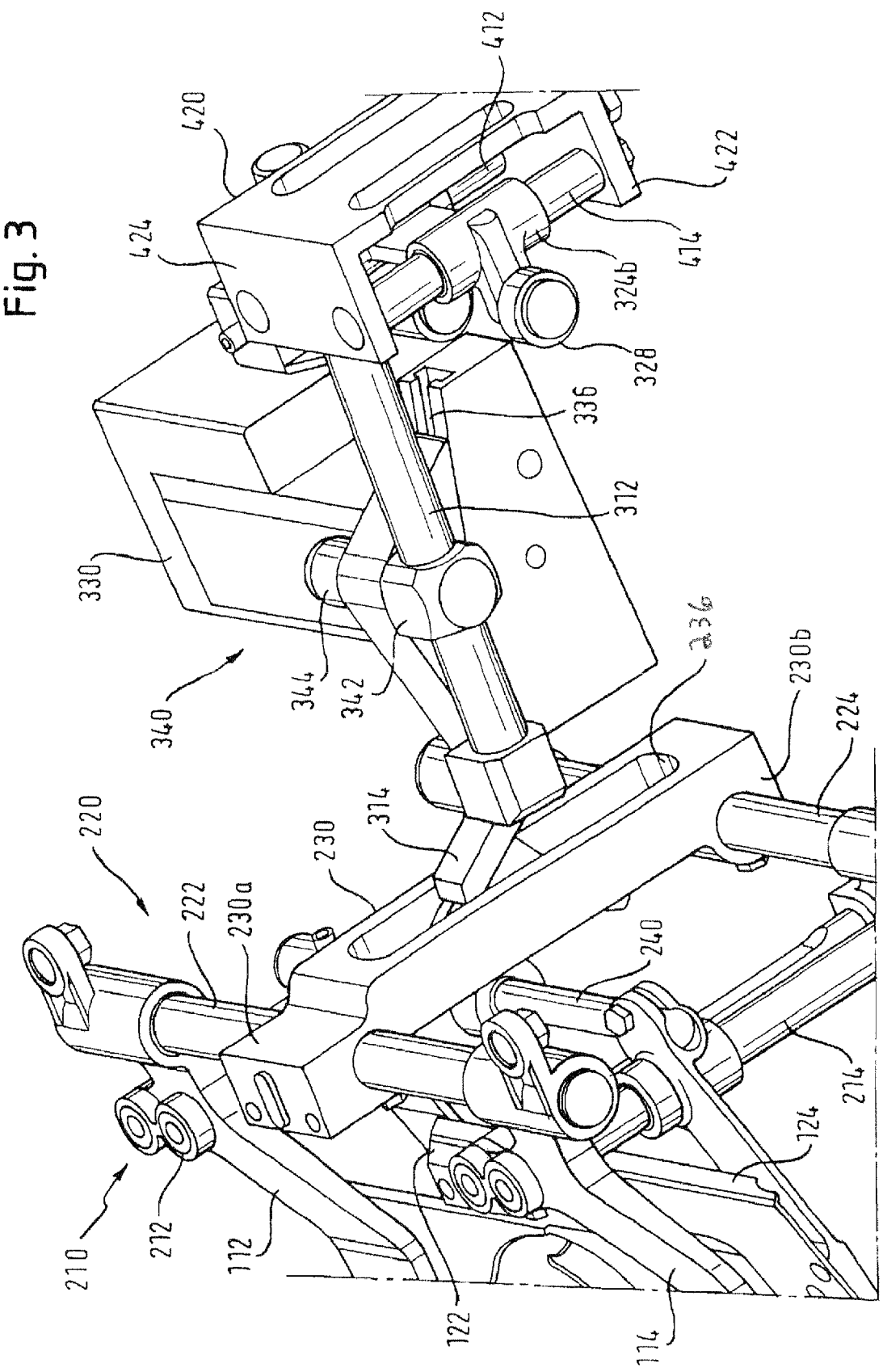
Figure 4:
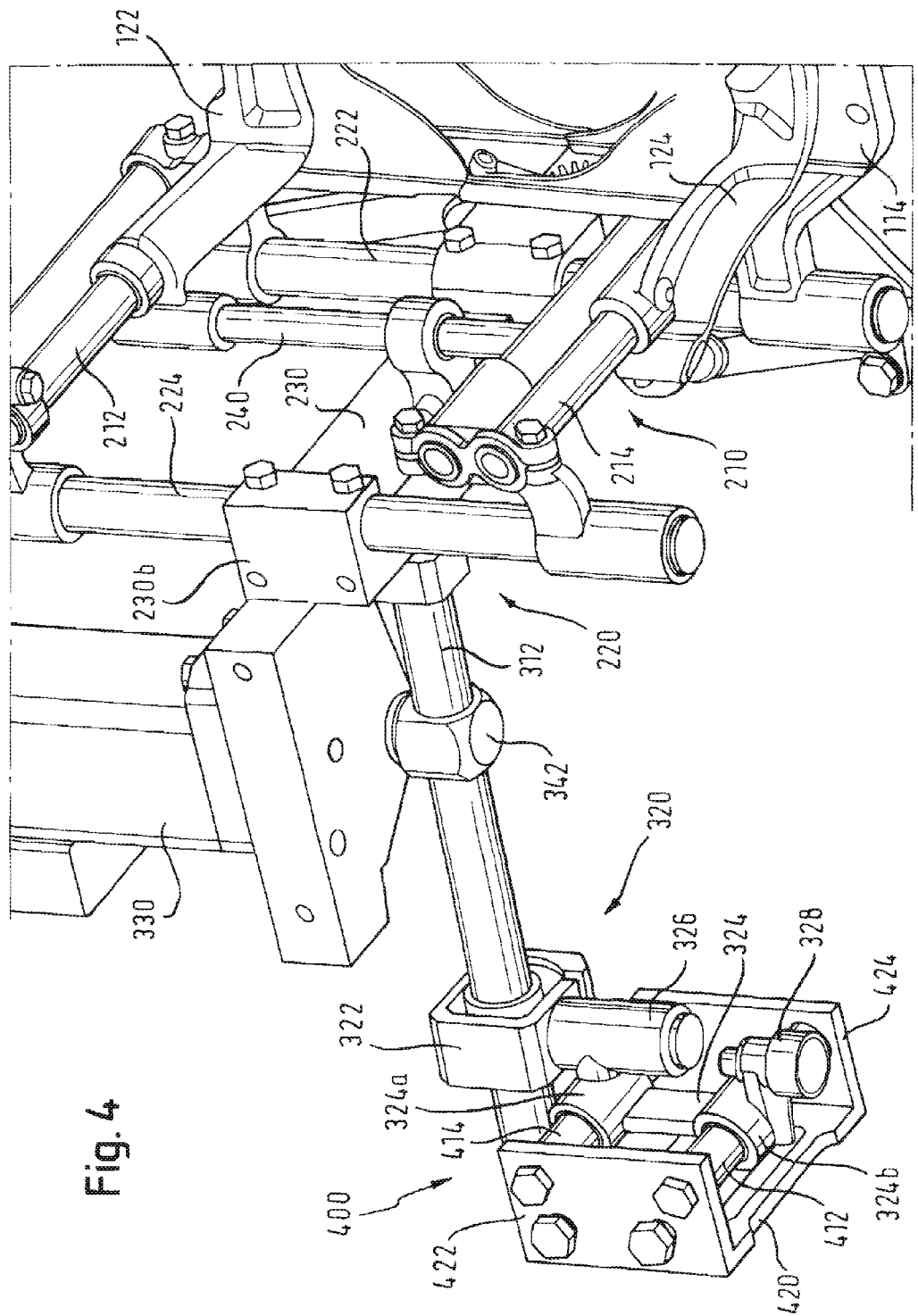

FIG. 1 shows a diagrammatic view of the structure in principle of a clipping machine in which the present invention is used, FIG. 2 shows a view from above on to the apparatus according to the invention, FIG. 3 shows a perspective view of the apparatus according to the invention from bottom right, and FIG. 4 shows a perspective view of the apparatus according to the invention from bottom left.

DETAILED DESCRIPTION

The embodiment described hereinafter by way of example of an apparatus according to the invention for producing a filling material-free plaited portion Z on a packaging casing or cover material VH is used in a clipping machine C. In this clipping machine C, diagrammatically shown in FIG. 1, a horizontally oriented filling tube F extends from the left, on which there is a supply of packaging casing material VH and by way of which the filling material, here sausage meat, can be introduced into the packaging casing material VH which is closed in filling material-tight relationship at the front end by a clip CL.

Disposed immediately in front of the right-hand end of the filling tube F is a displacer shears arrangement 100 comprising two pairs of displacer shears 110, 120 which form displacer units and which are provided oriented in mutually parallel relationship and perpendicularly to the at least approximately horizontally extending conveyor and production path of movement of the sausage products P. The pair of displacer shears 110 at the left in the drawing is arranged stationarily. In contrast the right-hand pair 120 of displacer shears can be displaced linearly and reversibly in the conveyor direction. The two pairs of displacer shears 110, 120, in their opened condition, clear the path of conveyor movement for the filling material, which goes towards the right, while in the closed condition they constrict the packaging casing material VH disposed between them and prevent further filling thereof with filling material. Arranged in a vertical direction above and below the pairs of displacer shears 110, 120 is a respective closure tool S1, S2 of the clipping machine C, which is in a starting position (not shown in greater detail in FIG. 1) and which is used for placing and closing the clips CL. For that purpose the two closure tools S1, S2 which are formed by a ram S1 and a die S2 are movable reversibly towards the filling material-free plaited portion Z by means of a drive (not shown) from the starting position into a closure position. So that the closure tools S1, S2 can move into a position between the two pairs of displacer shears 110, 120, the pair of displacer shears 120 shown at the right in FIG. 1 is reversibly displaced towards the right by a predetermined distance. In that respect, the predetermined distance corresponds at least to the width of the closure tools S1, S2. As soon as the right-hand pair of displacer shears 120 has been moved towards the right, the two closure tools S1, S2 move towards each other, as shown in FIG. 1. The right-hand pair of displacer shears 120 can be moved still further towards the right over the distance necessary for the closure tools S1, S2 to move away from each other, as is shown in FIG. 1 and will be described in greater detail hereinafter.

The essential components of the apparatus according to the invention are shown in FIG. 2. As can be seen from FIG. 2, the apparatus according to the invention is composed of the above-mentioned displacer shears arrangement 100 and also a first guide element arrangement 200, a drive transmission unit 300 and a second guide element arrangement 400.

As already mentioned, the first pair of displacer shears 110 at the filling tube side is fixed stationarily to the upper end in FIG. 2 of a guide device 210 of the first guide element arrangement 200. The second pair of displacer shears 120 is arranged on the same guide device 210, parallel to the first pair of displacer shears 110. The second pair of displacer shears 120 is horizontally reversibly displaceable along that guide device 210 with respect to the first pair of displacer shears 110. The pairs of displacer shears 110, 120 each comprise two displacer shears 112, 114, 122, 124 which are moved in parallel relationship closely past each other. The displacer shears 112, 122 are mounted on a first horizontal tube 212 of the guide device 210 and the displacer shears 114, 124 are mounted on a second tube 214 of the guide device 210, which is parallel to the first tube 212 and which is arranged beneath the first tube 212, as shown in FIGS. 3 and 4. The displacer shears 112, 114, 122, 124 are also moved reversibly vertically towards each other by the tubes 212, 214 which are vertically reversibly movable towards each other by means of a drive (not shown), whereby the pairs of displacer shears 110, 120 are closed or opened respectively. In the starting position the pairs of displacer shears 110, 120 are opened and the second pair of displacer shears 120 is positioned immediately beside the first pair 110. To minimise flexing of the guide tubes 212, 214 of the first guide device 210, arranged parallel to each of those thereabove in a vertical direction is a second tube (not identified).

Besides the above-mentioned first guide device 210, the first guide element arrangement 200, as shown in FIGS. 3 and 4, further has a second guide device 220 and a transverse member 230.

The guide elements 222, 224 of the second guide device 220 are oriented perpendicularly to the guide elements 212, 214, formed by the tubes 212, 214, of the first guide device 210, and are arranged at the side thereof that is remote from the pairs of displacer shears 110, 120. The guide elements 222, 224 of the second guide device 220 are each formed by a respective guide tube 222, 224 which extend parallel to each other.

The transverse member 230 is of a substantially parallelepipedic configuration with cranked thickened ends 230a, 230b. Two bores 232, 234 extend parallel to each other through those ends 230a, 230b and perpendicularly to a side surface. The bores 232, 234 receive and centrally fix the two guide tubes 222, 224 of the second guide device 220. The guide tube 212 of the first guide device 210 is arranged displaceably parallel to the transverse member 230, at the portions, which face perpendicularly upwardly from the transverse member 230 in FIG. 4, of the guide tubes 222, 224 of the second guide device 220. The guide tube 214 of the first guide device 210 is arranged displaceably parallel to the transverse member 230 at the portions, facing downwardly in FIG. 4, of the guide tubes 222, 224 of the second guide device 220. Disposed at the ends of the transverse member 230 are screwthreaded bores (not identified) for securing the transverse member 230 to a machine frame (also not shown).

A vertical guide bar 240 is arranged to extend parallel to the second guide device 220 and perpendicularly between the transverse member 230 and the guide device 210. The second pair of displacer shears 210 is vertically displaceably secured thereto. In that way, simultaneous horizontal displaceability of the displacer shears 122, 124 along the first guide device 210 is guaranteed, as well as vertical orientation thereof relative to each other.

As shown in FIG. 2 the drive transmission unit 300 substantially comprises a drive force transmission unit 310, a drive unit 320 and an actuating unit 330 which includes a pivot point 340.

The drive force transmission unit 310 is formed from an actuating bar 312 which is offset or cranked at its end 314 towards the pairs of displacer shears 110, 120. The cranked configuration can be provided to prevent collisions between moving parts of the machinery. The actuating bar 312 is of a round cross-section and extends towards the left, in the direction of the above-mentioned second guide element arrangement 400, horizontally and substantially perpendicularly to a plane formed by the central axes of the guide tubes 212, 214 of the first guide device 210. With its cranked end 314, the actuating bar 312 is secured pivotably and approximately centrally to the vertical guide bar 240, in which respect, as shown in FIG. 3, it is passed through a horizontal slot 236 in the transverse member 230. A portion of the end region of the actuating bar 312, which end region is opposite to the cranked end and is not identified in greater detail, is mounted in an elastically hinged buffer element 322 at the drive unit 320.

The drive unit 320 comprises a horizontally reversibly displaceable carriage 324 including two sleeves 324a, 324b oriented in mutually parallel relationship. Arranged at the upper sleeve 324a in FIG. 4, on its side towards the displacer shears arrangement 210 and perpendicularly to its longitudinal axis, is the carrier element 326 of the upwardly adjoining elastic buffer element 322. The shaft (not identified) of a downwardly adjoining guide roller 328 is arranged at the lower sleeve 324b on the same side and coaxially with the carrier element 326 of the buffer element 322. The guide roller 328 is in engagement with a drive (not shown) which can be formed for example by a cam disk. The drive unit 320 can be moved by that drive reversibly between two abutment positions which will be described in greater detail hereinafter, along a third guide device 410. The actuating bar 312 is guided by the pivot point 340 between its two ends.

As can be seen from FIG. 4, in adjoining relationship towards the left is the above-mentioned second guide element arrangement 400 which is composed of the third guide device 410 held by an abutment device 420.

The third guide device 410 comprises two horizontally oriented guide tubes 412, 414 which extend parallel one above the other and are arranged parallel to the tubes 212, 214 of the first guide device 210. The carriage 324 is arranged displaceably with a respective sleeve 324a, 324b on each of those guide tubes 412, 414. The tubes 412, 414 of the third guide device 410 are held at their ends by an abutment device 420 comprising two parallel fixing plates 422, 424, the main planes in which they extend being perpendicular to the guide tubes 412, 414. The abutment device 420 is fixed to the machine frame in a fashion not shown here and forms a first fixing plate 422 and a second fixing plate 424 for the carriage 324 guided on the third guide device 410.

In the first abutment position, the carriage 324 of the drive unit 320 is in contact against the first fixing point 422, and in a second abutment position, it is in contact against the second fixing point 424 of the abutment device 420.

The actuating unit 330, which includes the above-mentioned pivot point 340, is arranged between the guide element arrangements 200, 400 in immediate proximity with the drive force transmission element 310.

The actuating unit 330 comprises a carrier device 332 which is fixedly mounted to the machine frame and which includes a drive (not shown), and a movable adjusting device 334 movable by the drive along a guide path 336. The machine frame (not shown) extends in FIG. 2 horizontally at the lower edges of the fixedly mounted carrier device 332 and the lower end of the transverse member 230. The guide path 336 and the lower edge, extending horizontally in FIG. 2, of the fixedly mounted carrier device 332 include an acute angle. That angle gives the guide path 336 such a slope that, when the carriage 324 is in the first abutment position, the guide path extends parallel to the axis of the actuating bar 312. As shown in FIG. 3 the guide path 336 is formed by a T-shaped groove. It can however also involve any other suitable guide configuration, such as for example a dovetail guide or a prism guide.

The pivot point 340 is mounted to the movable carrier device 334. It comprises a mounting bush 342 in which the actuating bar 312 is displaceably supported. The mounting bush 342 is also pivotable about a pivot spindle 344 extending perpendicularly to the actuating bar 312. The drive included in the actuating unit 330 actuates a pinion 338a, which is in engagement with a toothed rack 338b on the movable adjusting device 334. The guide path 336 and the rack 338b extend parallel to each other, whereby the movable adjusting device 334 is reversibly displaceable along the guide path 336 by means of the drive. With it, the pivot point 340 is also displaced along the actuating bar 312.

The displacement of the pivot point 340 causes a change in the length ratio of the lever portions of the actuating bar 312, that is to say the two portions in front of and behind the pivot point 340. That causes a change in the stroke movement of the second pair of displacer shears 120. Thus the length of the plaited portion Z which is formed between pairs of displacer shears 110, 120 and corresponds to the stroke of the second pair 120 of displacer shears can be adjusted. In that case, the slope of the guide path 336 ensures that the starting position of the pairs of displacer shears 110, 120 remains unchanged.

The operating movements performed by the apparatus according to the invention are described hereinafter with reference to the production of a sausage product P.

A filling material, here sausage meat, is fed from a filling machine by way of the filling tube F to a clipping machine C. Disposed around the filling tube F is the supply of tubular packaging casing or cover material VH. It is filled in known fashion. Simultaneous placement and closure of two clips CL on a filling material-free portion of the packaging casing material VH in the clipping machine C provides on the one hand for finishing the sausage product P which has just been filled while on the other hand creating the starting tail portion of a new product P which is still to be filled. A severing tool such as for example a blade severs the finished sausage product P from the supply of tubular packaging casing material VH. When the clips CL are placed in position and closed, in that case a suspension element (not shown) in the form of a loop of thread is fed into the clip CL which finishes the sausage product P, by way of a feed device, and fixed to the sausage product P with that clip CL.

When a fresh starting tail portion has been produced by placement of a clip CL, a given amount of filling material is conveyed into the packaging casing material VH through the filling tube F. The pairs of displacer shears 110, 120 are in their starting position. In other words, they are parallel to each other, in a vertical plane, immediately in front of the end of the filling tube F, that is towards the clipping machine, and the shears 112, 114, 122, 124 are moved away from each other. In addition the two closure tools S1, S2 are moved away from each other in their starting position above and below the pairs of displacer shears 110, 120. When the predetermined amount of filling material has been introduced into the casing, the feed is interrupted. The displacer shears 112, 114, 122, 124 are now brought together. In that case the filling material in that region is displaced and the packaging casing material VH is gathered together. The drive unit 320 is then moved by its drive out of the first abutment position in which the carriage 324 of the drive unit 320 is in contact against the fixing point 422 in the direction of its second abutment position. In that operation the end, towards the drive, of the drive force transmission unit 310 is moved with the drive unit 320. As a result the drive force transmission unit 310 pivots in its horizontal plane about the pivot axis 344 of the pivot point 340 and with its cranked end 314 moves the vertical guide bar 240 horizontally along the guide device 210.

Fixed to the vertical guide bar 240 is the second pair of displacer shears 120 that is now further moved linearly in the conveyor direction along the first guide device 210 from the first pair of displacer shears 110. The portion of the packaging casing material VH, which is chock-full with filling material, is moved away from the filling tube F by the second pair of displacer shears 120 and additional packaging casing material VH is drawn from the supply through between the displacer shears 112, 114 of the first pair 110. That creates a filling material-free plaited portion Z on which the clips CL are now fitted. If it is provided that a suspension element is to be fixed to the sausage product P, it is laid in the clip CL which finishes the sausage product P, and fixed thereto. When both clips CL are fitted the finished sausage product P can be severed from the rest of the supply of packaging casing material VH by a severing tool such as for example a blade. The shears 112, 114, 122, 124 are moved vertically away from each other and release the plaited portions held thereby. The finished sausage product P is conveyed out of the clipping machine by a transport arrangement (not shown). The second pair of displacer shears 120 is moved back into the above-described starting position. That takes place in the reverse sequence of the movements involved in moving them away from each other as described hereinbefore. When the pairs of displacer shears 110, 120 are in the starting position again, a fresh working cycle can begin. In such a working cycle the drive unit 320 is moved precisely once from the first abutment position in which the pairs of displacer shears 110, 120 are disposed in their starting position, into the second abutment position, and moved back into the first position again.

If the length of the filling material-free plaited portion Z is to be altered, for example, to produce sausage products of a different size from that which is set, that is affected by displacement of the pivot point 340 on the actuating bar 312 along the guide path 336 of the carrier device 332.

If it is necessary to increase the length of the filling material-free plaited portion Z, the adjusting device 334 which includes the pivot point 340 is displaced along the guide path 336 of the carrier device 332 in the direction of the drive unit 320. As a result the lever portion of the actuating bar 320, which faces from the pivot point 340 towards the drive unit 320, becomes shorter, and the lever portion facing towards the displacer shears arrangement 100 becomes longer. If the displacement distance of the carriage 324 remains the same, the modified length ratio of the lever portions of the actuating bar 312 means that the displacement distance of the second pair of displacer shears 120 with respect to the first pair 110 is increased in length. As, when the carriage 324 is in the first abutment position, the guide path 336 extends parallel to the actuating bar 312, the displacement distance of the second pair of displacer shears 120 is increased exclusively in the conveyor direction towards the right. The starting position of the second pair of displacer shears 120, in parallel relationship closely beside the first pair of displacer shears 110, remains unchanged.

If a reduction in the length of the filling material-free plaited portion Z is to be achieved, the adjusting device 334, which includes the pivot point 340, is displaced along the guide path 336 of the carrier device 332 in the direction of the displacer shears arrangement 100. In accordance with the foregoing description, the length ratio of the lever portions of the actuating bar 312 changes in such a way that the displacement distance of the second pair 120 of displacer shears is reduced. In this case also, as already described above, the starting position of the second pair of shears 120 remains unchanged.

In addition, it is also to be noted that all the described components, unless stated otherwise, are made from high-quality steel.

Finally, it is also to be noted that the invention is not restricted to the structures shown in FIGS. 2 through 4. Thus the drive of the drive force transmission unit 310 can be formed for example by an eccentric. The guide element arrangements 200, 400 can also be formed by parts other than tubes. It is likewise conceivable to use a transmission arrangement other than a tooth transmission arrangement, for example a chain drive, for adjustment of the pivot point 340.

The invention claimed is:

1. An apparatus for producing a plaited portion on a packaging casing material which accommodates a filling material, the apparatus comprising:
 a first displacer unit;
 a second displacer unit, wherein the second displacer unit is displaceable reversibly in a linear movement with respect to the first displacer unit; and
 a drive unit for at least the drive for the linear movement of the second displacer unit, wherein provided between the drive unit and the second displacer unit is at least one drive force transmission unit which transmits the drive force produced by the drive unit to the second displacer unit, the drive force transmission unit being reversibly pivotable about a pivot point, and the position of the second displacer unit is adjustable.

2. The apparatus of claim 1, wherein the position of the pivot point is adjusted by an actuating unit pivotably connected to the drive force transmission unit, which includes the pivot point, and is displaceable reversibly along a guide path of an adjusting drive.

3. The apparatus of claim 2, wherein the guide path extends in an orientation extending substantially parallel to a notional line between a pivotal connecting point of the second displacer unit and a force application point at the drive force transmission unit to the drive unit.

4. The apparatus of claim 1, wherein the drive force transmission unit comprises an actuating bar, which at a first end facing towards the second displacer unit, is hingedly connected to the second displacer unit and, which at a second end facing towards the drive unit, is operatively connected to the drive unit.

5. The apparatus of claim 4, wherein a region of the first end of the actuating bar faces towards the second displacer unit, the actuating bar having a crank configuration which is in the plane of movement.

6. The apparatus of claim 5, wherein the second displacer unit is guided along a first guide device including a plurality of first guide bars, wherein the plurality of first guide bars form a guide axis intersecting a longitudinal central axis of the drive force transmission unit.

7. The apparatus of claim 6, wherein in the region of the drive unit, the drive force transmission unit is guided along a third guide device including a plurality of second guide bars, wherein the plurality of second guide bars form a guide axis which intersects the longitudinal central axis of the drive force transmission unit.

8. The apparatus of claim 7, wherein the drive force transmission unit is tied to the third guide device by an elastically hinged buffer element.

9. The apparatus as of claim 8, wherein the drive force transmission unit has a hinged mounting in the region of its end facing towards the drive unit.

10. The apparatus of claim 9, wherein at least one of the first and the second displacer units are formed by a linear spreading displacer.

* * * * *